United States Patent
Dong et al.

(10) Patent No.: US 9,110,303 B2
(45) Date of Patent: Aug. 18, 2015

(54) 3D DISPLAY PANEL AND METHOD OF MANUFACTURING PHASE DIFFERENCE PLATE

(75) Inventors: Youmei Dong, Beijing (CN); Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 560 days.

(21) Appl. No.: 13/483,912

(22) Filed: May 30, 2012

(65) Prior Publication Data
US 2012/0307168 A1 Dec. 6, 2012

(30) Foreign Application Priority Data
May 31, 2011 (CN) .......................... 2011 1 0145466

(51) Int. Cl.
| | | |
|---|---|---|
| *G02F 1/1335* | (2006.01) | |
| *G02B 27/26* | (2006.01) | |
| *H04N 13/04* | (2006.01) | |
| *G02F 1/1337* | (2006.01) | |
| *G02F 1/13363* | (2006.01) | |

(52) U.S. Cl.
CPC ............ *G02B 27/26* (2013.01); *H04N 13/0434* (2013.01); *G02F 1/133788* (2013.01); *G02F 2001/133538* (2013.01); *G02F 2001/133562* (2013.01); *G02F 2001/133565* (2013.01); *G02F 2001/133631* (2013.01); *G02F 2001/133638* (2013.01)

(58) Field of Classification Search
USPC .................................................... 349/15, 117
See application file for complete search history.

(56) References Cited

U.S. PATENT DOCUMENTS

| | | | |
|---|---|---|---|
| 6,046,787 A | 4/2000 | Nishiguchi | |
| 6,128,059 A * | 10/2000 | Nishiguchi | ................... 349/129 |
| 6,624,863 B1 | 9/2003 | Jacobs | |
| 6,734,936 B1 | 5/2004 | Schadt et al. | |
| 6,735,017 B1 | 5/2004 | Acosta et al. | |
| 8,736,798 B2 | 5/2014 | Kim | |
| 2001/0005284 A1 | 6/2001 | Lee | |
| 2002/0008837 A1* | 1/2002 | Hisamitsu et al. | ............ 349/175 |
| 2002/0145682 A1 | 10/2002 | Kwon | |
| 2002/0159004 A1 | 10/2002 | Jung | |
| 2008/0143638 A1 | 6/2008 | Kim | |

(Continued)

FOREIGN PATENT DOCUMENTS

| | | |
|---|---|---|
| CN | 101349828 A | 1/2009 |
| CN | 101876767 A | 11/2010 |

(Continued)

OTHER PUBLICATIONS

KIPO Office Action dated Aug. 26, 201; Appln. No. 10-2012-0057555.

(Continued)

*Primary Examiner* — Lucy Chien
(74) *Attorney, Agent, or Firm* — Ladas & Parry LLP (57) ABSTRACT

Embodiments of the disclosed technology provide a three dimensional (3D) display panel and a method of manufacturing a phase difference plate. The 3D display panel comprises: a display panel which comprises a first substrate and a second substrate facing each other, the first substrate comprising a first polarizer, the second substrate comprising a second polarizer; and a phase difference plate which is directly disposed on a surface of the first substrate on an opposite side of the second substrate.

16 Claims, 7 Drawing Sheets

(56) References Cited

U.S. PATENT DOCUMENTS

2009/0021675 A1 1/2009 Kishioka et al.
2011/0217638 A1 9/2011 Kim et al.
2012/0307168 A1 12/2012 Dong

FOREIGN PATENT DOCUMENTS

| EP | 0 887 667 A2 | 12/1998 |
| JP | 10-253824 A | 9/1998 |
| JP | 11-084131 A | 3/1999 |
| JP | 11-084385 A | 3/1999 |
| JP | 2001-525080 A | 12/2001 |
| KR | 20050000572 A | 1/2005 |
| KR | 20070060812 A | 6/2007 |
| KR | 100783358 B1 | 12/2007 |
| KR | 100824782 B1 | 4/2008 |
| WO | 2005/012990 A1 | 2/2005 |

OTHER PUBLICATIONS

KIPO Decision to Refuse a Patent dated Sep. 1, 2014 KR 10-2012-0057555.
KIPO Decision to Refuse a Patent dated Oct. 17, 2014 KR 10-2012-0057531.
Non-Final Office Action dated Sep. 25, 2014 regarding U.S. Appl. No. 13/483,867.
Third Chinese Office Action dated May 23, 2013 CN201110145466.7.
Fourth Chinese Office Action dated Nov. 20, 2013 CN201110145466.7.
Chinese Notice of Allowance dated May 27, 2014 CN201110145466.7.
USPTO RR dated Jul. 17, 2014 in connection with U.S. Appl. No. 13/483,867.
USPTO NFOA dated Sep. 25, 2014 in connection with U.S. Appl. No. 13/483,867.
Fourth Chinese Office Action dated Jan. 8, 2014; Appln. No. 201110145645.0.
Korean Examination Opinion dated Mar. 28, 2014; Appln. No. 10-2012-0057531.
Korean Office Action—Observation dated Aug. 26, 2014; Appln. No. 10-2012-0057531.
Korean Examination Opinion dated Jul. 11, 2014; Appln. No. 10-2012-0057555.
Korean Examination Opinion dated Aug. 8, 2014; Appln. No. 10-2012-0057531.
Second Chinese Office Action dated Nov. 20, 2013; Appln. No. 201110145466.7.
Korea Office Action dated Feb. 14, 2014; Appln. No. 10-2012-0057555.
EPO Communication dated Mar. 17. 2014; Appln. No. 12 169 915.1-1904.
First Chinese Office Action dated Mar. 1, 2012 Appln. No. 20111045645.0.
Second Chinese Office Action dated Dec. 5, 2012 Appln. No. 20111045645.0.
First Chinese Office Action dated Mar. 1, 2012 Appln. No. 201110145466.7.
Second Chinese Office Action dated Dec. 5, 2012 Appln. No. 201110145466.7.
Extended European Search Report dated Jan. 4, 2013; Appln. No. 12169927.6-2217/2530500.
Extended European Search Report dated Aug. 27, 2012; Appln. No. 12169915.1-2205.
European Patent Office Action dated Dec. 22, 2014; Appln. No. 12 169 915.1-1904.
USPTO FOA dated Jan. 30, 2015 in connection with U.S. Appl. No. 13/483,867.

* cited by examiner

FIG. 13

3D DISPLAY PANEL AND METHOD OF MANUFACTURING PHASE DIFFERENCE PLATE

CROSS REFERENCE TO RELATED APPLICATIONS

This application claims the benefit of Chinese Patent Application No. 201110145466.7 filed May 31, 2011, the entire disclosure of which is incorporated herein by reference. Cross-reference is made to U.S. patent application Ser. No. 13/483,867, filed May 30, 2012, entitled "METHOD OF MANUFACTURING PHASE DIFFERENCE PLATE AND 3D DISPLAY PANEL", which is incorporated herein by this reference in its entirety.

BACKGROUND

Embodiments of the disclosed technology relate to a three dimensional (3D) display panel and a method of manufacturing a phase difference plate.

Stereoscopic display has become a trend of the display field. And, the hypostasis of the stereoscopic display is to produce a stereoscopic effect by utilizing a parallax, i.e., a left-eye picture is seen by the left eye of a person, and a right-eye picture is seen by his right eye. The left-eye and right-eye pictures are a pair of stereoscopic images having the parallax.

One mode to achieve the stereoscopic display is of a serial type, i.e., at a first time, a left-eye picture is displayed on a display and the displayed picture is only seen by the left eye of a viewer at this time; and at a second time, a right-eye picture is displayed on the display and the displayed picture is only seen by the right eye of the viewer. The pictures will be retained on retinas of human eyes for a period of time, so as to give the person a feeling that the left-eye and right-eye pictures are simultaneously seen by the left and right eyes. Thus, a stereoscopic sensation is produced.

Another mode to achieve the stereoscopic display is of a parallel type, i.e., at the same time, content for a left-eye picture is displayed by a part of pixels on a display, and content for a right-eye picture is displayed by a part of pixels. The displayed right-eye picture only can be seen by the right eye and the displayed left-eye picture only can be seen by the left eye through devices such as gratings, polarized glasses, so as to produce the stereoscopic sensation.

Figure 1:
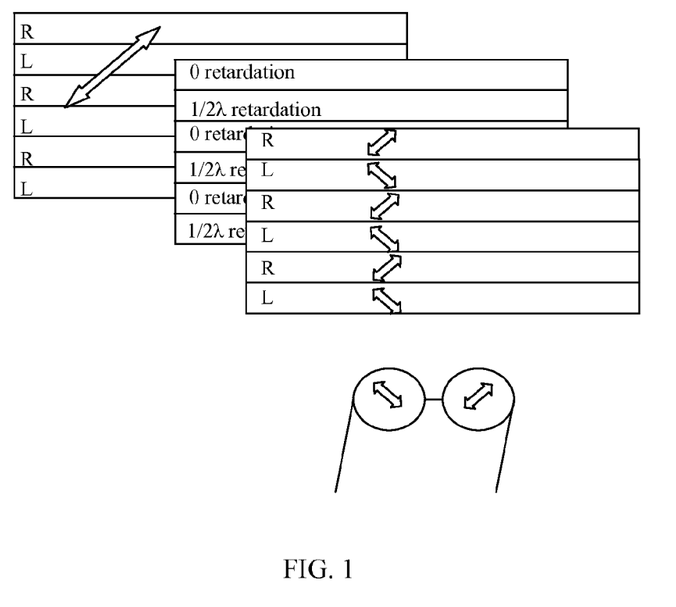
FIG. 1 is a schematic view showing the principle of achieving a 3D display by employing a phase difference plate in prior art.

Polarized glasses type stereoscopic display is a currently mainstream technology in the field of stereoscopic display, and the basic structure of this technology is to install a device for adjusting a polarization direction of light being emitted in front of a display panel. The device may be a phase difference plate, a liquid crystal cell, or other device capable of adjusting the polarization direction of the light emitted from different pixels. The principle of stereoscopic display of the phase difference plate is as shown in FIG. 1, and from top to bottom, there are: a picture displayed by the display panel, a phase difference plate, a picture formed by the light passing through the phase difference plate, and polarized glasses for viewing. On the display panel, a right-eye picture is shown in a row, and a left-eye picture is shown in a row. A phase difference plate is disposed in front of the display panel, one row has a $\lambda/2$ retardation ($\lambda$ is the wavelength of light), and one row has a zero retardation. The light emitted from pixels for the portion having the $\lambda/2$ retardation rotates, after passing through the phase difference plate, 90° in its polarization direction. Thus, only a light emitted by right-eye pixels can be seen by the right eye and only a light emitted by left-eye pixels can be seen by the left eye when polarized glasses, polarization directions of which for the left and right eyes are perpendicular to each other, are put on, so as to produce the stereoscopic effect. Alternatively, one row has a $\lambda/4$ retardation and one row has a $3\lambda/4$ retardation in a scheme.

In various polarized glasses stereoscopic displays, a technology in which a phase difference plate is employed is the most favorite. Its basic structure is that, the phase difference plate is attached to the display panel after being precisely aligned thereto. Different phase retardations can be produced in different regions on the phase difference plate, so that light from different pixels is emitted in different polarization directions and a viewer can see a 3D effect when wearing polarized glasses.

Figure 2:
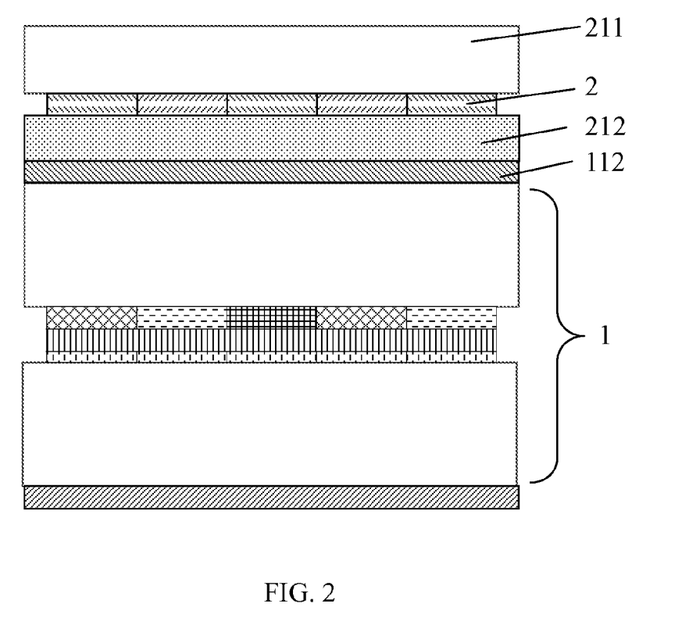
FIG. 2 is a schematic view showing a structure in which a phase difference plate is attached to a polarizer in an attachment manner in prior art.

Currently, a method of manufacturing a 3D display panel based on a phase difference plate is: firstly, the phase difference plate is produced on a substrate (e.g., a glass or a thin film substance) for the phase difference plate, and then the phase difference plate is attached to the display panel with a double-side tape or other adhesives. Its base structure is as shown in FIG. 2. A phase difference plate 2, which is produced on a substrate 211 for the phase difference plate, is adhered to an upper polarizer 112 of a display panel 1 with an adhesive 212.

Problems present in the above manufacture process of the phase difference plate lie in that, when the phase difference plate is aligned and attached to the display panel, it is always difficult to align precisely and the accuracy is very low, leading to a very low yield and severe crosstalk for a 3D product which is manufactured in this manner; moreover, as a layer of the adhesive 212 and the substrate 211 for the phase difference plate are added, loss of light will occur; and a distance from a light emitting point (red, green and blue light emitting points on a display substrate) to the phase difference plate is increased, thereby reducing the viewing angle. These problems have severely hindered the development of the phase difference plate type 3D display.

SUMMARY

An embodiment of the disclosed technology provides a three dimensional (3D) display panel, comprising: a display panel which comprises a first substrate and a second substrate facing each other, the first substrate comprising a first polarizer, the second substrate comprising a second polarizer; and a phase difference plate which is directly disposed on a surface of the first substrate on an opposite side of the second substrate.

Another embodiment of the disclosed technology provides a method of manufacturing a phase difference plate, comprising the following steps: S1: applying an alignment layer on a surface of an upper substrate of a display panel; S2: performing an alignment treatment on the alignment layer, so as to divide the alignment layer into a plurality of regions with at least two different alignment directions; and S3: applying a layer of reactive mesogens on the alignment layer subjected to the alignment treatment, and have the reactive mesogens aligned and solidified, so as to form the phase difference plate.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Embodiments of the disclosed technology now will be described more clearly and fully hereinafter with reference to the accompanying drawings, in which the embodiments of the disclosed technology are shown. Apparently, only some embodiments of the disclosed technology, but not all of embodiments, are set forth here, and the disclosed technology may be embodied in other forms. All of other embodiments made by those skilled in the art based on embodiments disclosed herein without mental work fall within the scope of the disclosed technology.

Embodiment 1

In the embodiment, a three dimensional (3D) display panel comprising a liquid crystal panel and a phase difference plate is provided, the liquid crystal panel comprising an upper substrate and a lower substrate facing each other, a liquid crystal layer filled between the upper substrate and the lower substrate, and other components. The upper substrate comprises an upper polarizer, and the lower substrate comprises a lower polarizer. The phase difference plate directly covers an upper surface of the upper substrate of the liquid crystal panel. In general, the upper substrate is a color filter substrate, and the lower substrate is an array substrate. The upper substrate comprises a base substrate, a color filter layer and so on, and the lower substrate comprises a base substrate, an array layer and so on. However, the structure and the components of the upper and lower substrates may change according to practical situation. The base substrate of the upper substrate and the base substrate of the lower substrate each can be a glass substrate or other transparent substrate, such as a plastic substrate, etc. It can be understood by those skilled in the art that, when the upper polarizer or the lower polarizer is located inside the upper substrate or the lower substrate, they constitute a part of the upper substrate or the lower substrate actually. For illustrative convenience, according to embodiments of the disclosed technology, the polarizers (the upper and lower polarizers) are described as components dependent from the upper and lower substrates somewhere without causing confusion and misunderstanding. Note that, only the 3D display panel and components of the liquid crystal panel concerning the disclosed technology are described and illustrated, and other components irrelevant to the design point of the disclosed technology, such as a PI layer (alignment layer) of the liquid crystal panel, a common electrode layer of the color filter substrate, etc. are not described and illustrated.

Figure 3A:
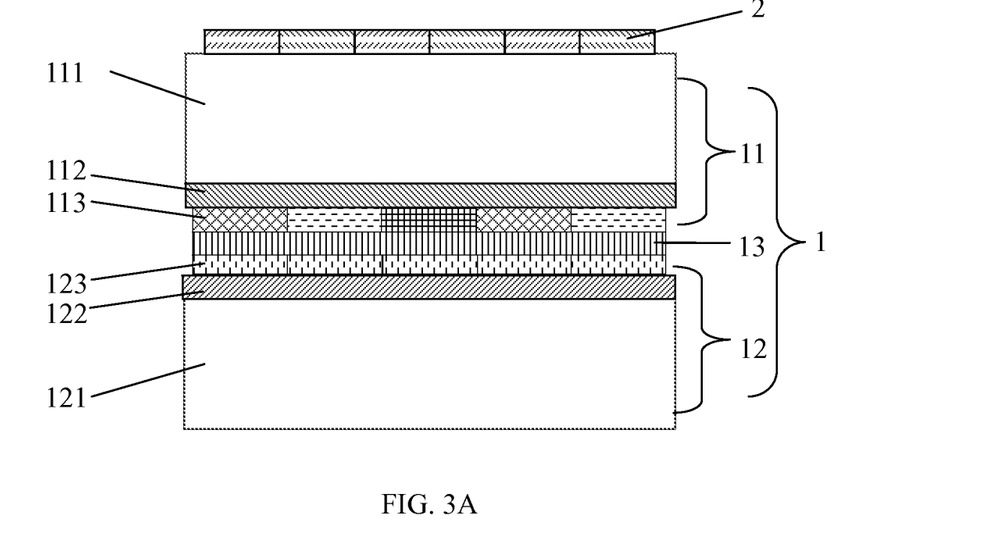
FIG. 3A is a schematic view showing a structure of a 3D display panel in which a phase difference plate is produced on a surface of an upper substrate.

FIG. 3A is a typical schematic view of the embodiment. In the embodiment, a phase difference plate 2 directly covers an upper surface of an upper substrate 11 of a liquid crystal panel 1. Specifically, the phase difference plate 2 is directly disposed on a base substrate 111 of the upper substrate 11 actually. In the 3D display panel shown in FIG. 3A, the liquid crystal panel 1 comprises the upper substrate 11, a lower substrate 12 and a liquid crystal layer 13 filled therebetween. The upper substrate 11 comprises the base substrate 111, an upper polarizer 112 and a color filter layer 113. The upper polarizer 112 is located between the base substrate 111 and the color filter layer 113. The lower substrate 12 comprises a base substrate 121, a lower polarizer 122 and an array layer 123, and the lower polarizer 122 is located between the base substrate 121 and the array layer 123.

Figure 3B:
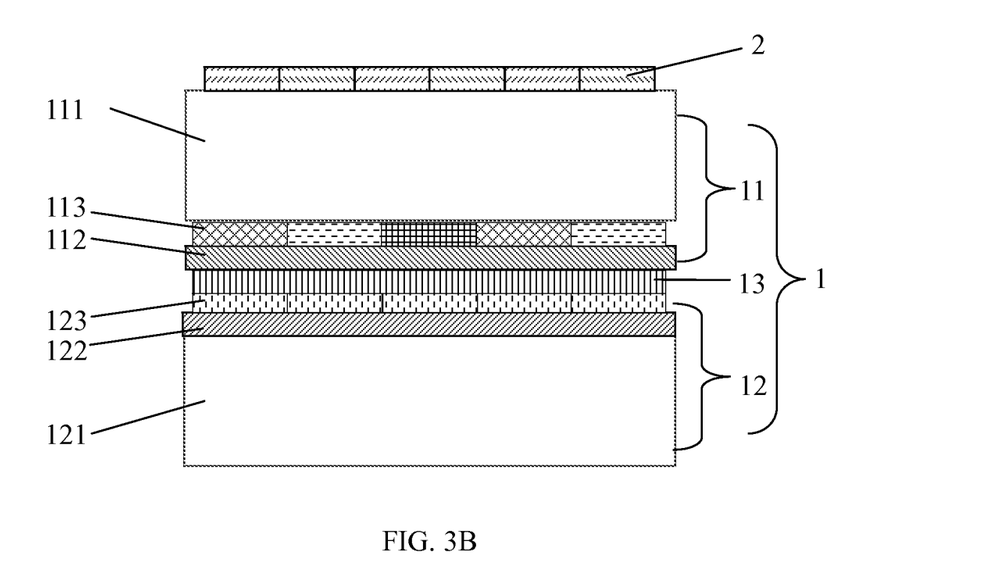
FIG. 3B is a schematic view showing a second structure of a 3D display panel in which a phase difference plate is produced on a surface of an upper substrate.

FIG. 3B is another typical schematic view of the embodiment. Likewise, a phase difference plate 2 directly covers an upper surface of an upper substrate 11 of a liquid crystal panel 1, i.e., is directly disposed on a base substrate 111 of the upper substrate 11. In the 3D display panel shown in FIG. 3B, the liquid crystal panel 1 comprises the upper substrate 11, a lower substrate 12 and a liquid crystal layer 13 filled therebetween. The lower substrate 12 is identical to that of the embodiment shown in FIG. 3A, and comprises a base substrate 121, a lower polarizer 122 and an array layer 123, and the lower polarizer 122 is located between the base substrate 121 and the array layer 123. The 3D display panel shown in FIG. 3B differs from that shown in FIG. 3A in that, in FIG. 3B, the upper substrate 11 still comprises the base substrate 111, the upper polarizer 112 and the color filter layer 113, but the color filter layer 113 is formed on the base substrate 111 and the upper polarizer 112 is located at a lower surface of the color filter layer 113.

Figure 3C:
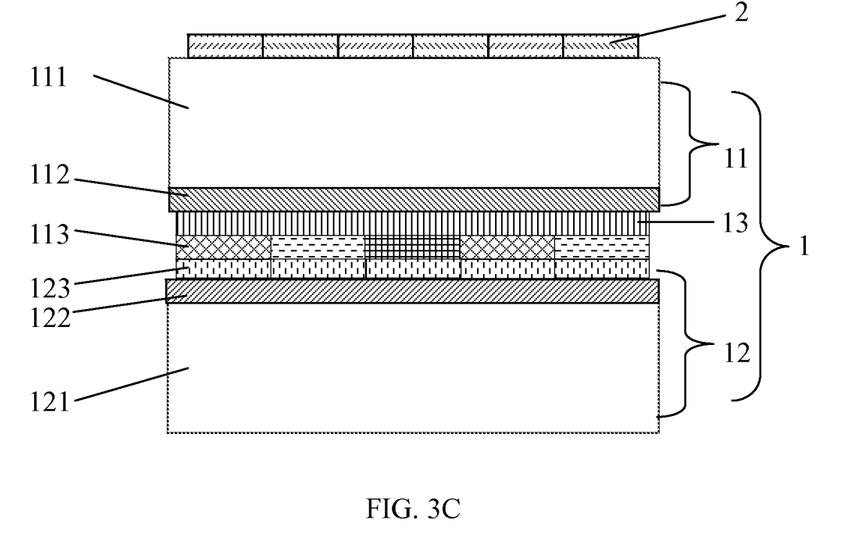
FIG. 3C is a schematic view showing a third structure of a 3D display panel in which a phase difference plate is produced on a surface of an upper substrate.

FIG. 3C is a further typical schematic view of the embodiment. Likewise, a phase difference plate 2 directly covers an upper surface of an upper substrate 11 of the liquid crystal panel 1, i.e., is directly disposed on a base substrate 111 of the upper substrate 11. In the 3D display panel shown in FIG. 3C, the liquid crystal panel 1 comprises the upper substrate 11, a lower substrate 12 and a liquid crystal layer 13 filled therebetween. Unlike the embodiments shown in FIG. 3A and FIG. 3B, in the 3D display panel shown in FIG. 3C, the liquid crystal panel 1 is a liquid crystal panel with a Color filter On Array (COA) configuration. The COA means that a color filter layer (RGB), which is generally produced on an upper substrate (a color filter substrate), is formed on an array substrate. As shown in FIG. 3C, in the embodiment, the upper substrate 11 of the liquid crystal panel 1 comprises the base substrate and the upper polarizer 112, and the upper polarizer 112 is directly formed at a lower surface of the base substrate 111. The lower substrate 12 comprises from down to up, a base substrate 121, a lower polarizer 122, an array layer 123 and a color filter layer 113 in sequence, i.e. the lower polarizer 122 is still located between the base substrate 121 and the array layer 123.

Figure 3D:
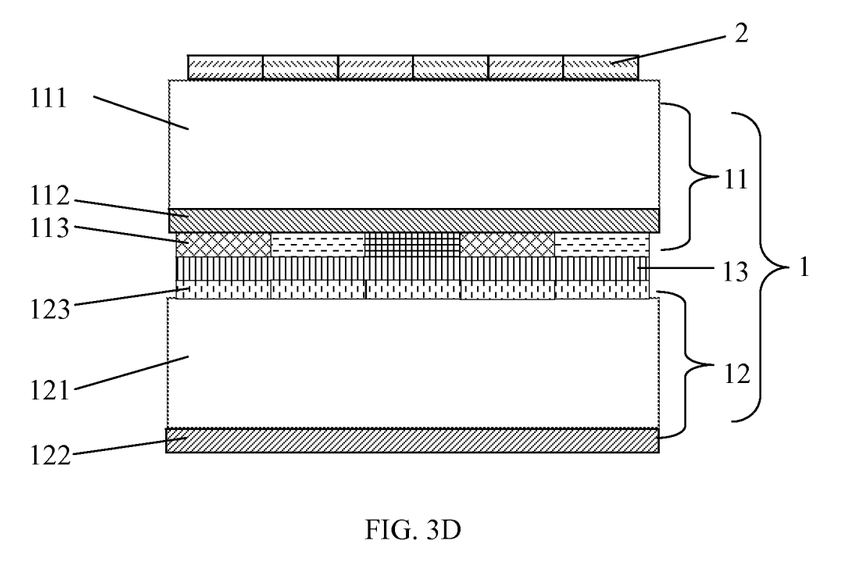
FIG. 3D is a schematic view showing a further structure of a 3D display panel in which a phase difference plate is produced on a surface of an upper substrate.

In FIGS. 3A, 3B and 3C, positions of the upper polarizer 112 in the liquid crystal panel 1 differs from one another, but the position of the lower polarizer 122 in the liquid crystal panel 1 does not change and is always between the base substrate 121 and the array layer 123. Actually, the position of the lower polarizer 122 is not limited to such a position, and the lower polarizer 122 may be set in different positions inside and outside of the liquid crystal panel. For example, it is still set at a lower surface of the lower substrate 12 according to the conventional method. FIG. 3D illustrates one of these schemes.

It should be understood by those skilled in the art that, FIGS. 3A to 3D does not illustrate all of the components of the liquid crystal panel 1; and, the liquid crystal panel 1 may be in a common TN mode, may also be in a horizontal electric field mode, VA mode or other electric field mode.

Hereinbefore, besides pertaining to the configuration of the phase difference plate on the liquid crystal panel, the configuration of the 3D display panel provided by the embodiment mainly relates to the configuration of the liquid crystal panel, and especially relates to the arrangement scheme of the upper polarizer and the lower polarizer. Change can be made by those skilled in the art on the basis of the above contents without departing from the design idea and protection scope of the disclosed technology. Thereinafter, the configuration of the phase difference plate of the 3D display panel provided by the embodiment will now be explained in detail.

Figure 4:
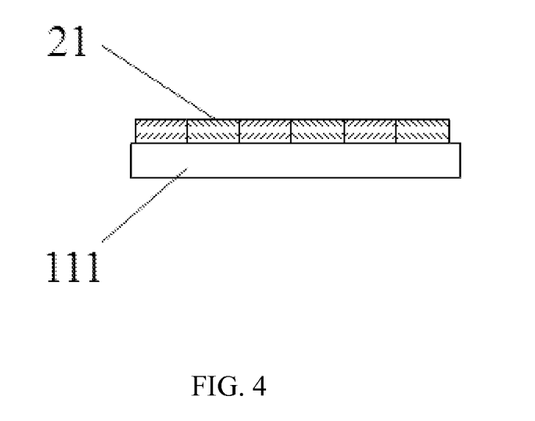
FIG. 4 is a schematic view showing a structure of a phase difference plate which is obtained after an alignment layer is produced on an upper substrate.

The phase difference plate 2 in the embodiment comprises an alignment layer, and the alignment layer is divided into a plurality of regions with at least two different alignment directions, as shown in FIG. 4, which is a schematic sectional view obtained after an alignment layer 21 is formed on the upper substrate 111.

Figure 5A:
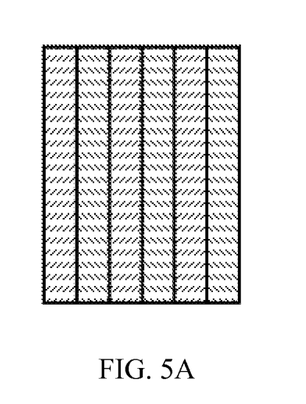
FIGS. 5A and 5B are top views showing an alignment manner of an alignment layer of a phase difference plate according to an embodiment of the disclosed technology, in which, FIG. 5A, aligned bar-like regions are vertically disposed, and in FIG. 5B, aligned bar-like regions are horizontally disposed.
Figure 5B:
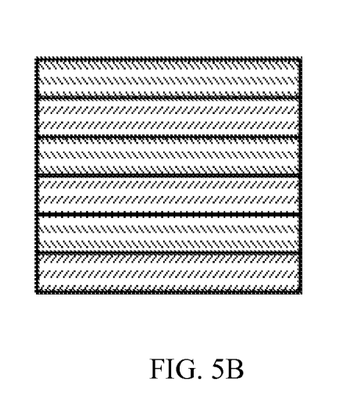

Specifically, the alignment layer is divided into a number of bar-like regions, and every two adjacent bar-like regions have different alignment directions. The bar-like regions may extend in a horizontal direction, a vertical direction or any other directions, and preferably, extend in the horizontal direction. FIGS. 5A and 5B are schematic top view of the alignment layer when the bar-like regions are in the horizontal direction and in the vertical direction, respectively. Moreover, bar-like regions of different types may be alternately arranged in sequence, and may be arranged in a chessboard shape or in other shapes.

To ensure the display effect, each row (column) of sub-pixels can only be covered by one kind of bar-regions (i.e. regions with the same alignment direction), and each bar-like region may cover a part or all of one row (or column) of the sub-pixels, or may also cover more than one row (or column) of the sub-pixels. Preferably, each bar-like region covers exactly one row (or column) of the sub-pixels. The case where horizontal bar-like regions are used on the phase difference plate is superior to the case where vertical bar-like regions are used in terms of the viewing effect, and thus, most preferably, horizontal bar-like regions are used on the phase difference plate, and each of the bar-like regions covers exactly one row of the sub-pixels.

The plurality of regions have at least two different alignment directions, and preferably, have two different alignment directions. In the case where the regions have two different alignment directions, an angle between the two different alignment directions may be 45° to 135°. Preferably, the angle between the alignment directions is 90°. Further, one of the alignment directions is parallel to a polarization direction of light emitted from the upper polarizer, and another alignment direction is perpendicular to the polarization direction of light emitted from the upper polarizer. The above preferable angle between alignment directions is set as 90°, which is a preferable design on the premise that an angle between polarization directions for two lenses of existing polarized glasses is 90°. It can be understood by those skilled in the art that, in the embodiment, a 3D display effect can be realized only if polarization directions for the upper polarizer of the display panel, the phase difference plate and the polarized glasses match with one another. In the case where the angle between polarization directions for two lenses of the polarized glasses is not 90° (for example, may also be 60°), the angle between alignment directions is preferably not 90° (for example, may also be 60°), either.

Figure 6:
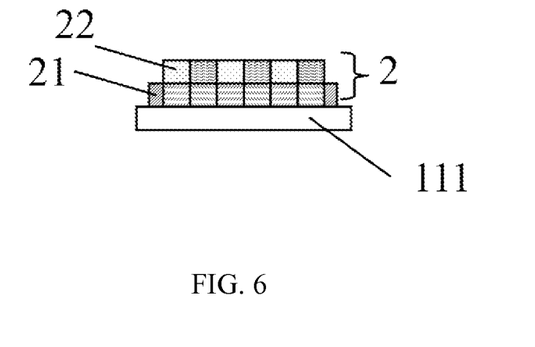
FIG. 6 is a schematic view showing a structure of a phase difference plate which is obtained after a RM is applied on an alignment layer, according to an embodiment of the disclosed technology.

Practically, function of the phase difference plate can be realized by the alignment layer itself, and thus, the phase difference plate 2 according to the embodiment may also include the alignment layer only. Further, in order to enable the phase difference plate to achieve a better effect, a layer of reactive mesogens (RM) 22 may further cover a surface of the alignment layer of the phase difference plate according to the embodiment, as shown in FIG. 6. Herein, the RM is generally referred as a reactive substance or RM reactant. The RM has a birefringence characteristic and is a kind of substance capable of being aligned and solidified. Specifically, the RM is a liquid crystal polymer or other suitable substance. Preferably, the RM is a liquid crystal polymer. The RM is aligned under the influence of the alignment layer directly thereunder. The solidified RM has the same alignment direction as a region of the alignment layer directly thereunder. Thus, in correspondence with different regions of the alignment layer, the solidified RM is also formed into a plurality of regions with different alignment directions.

A 3D display device comprising the above 3D display panel is also provided by the embodiment. The 3D display device may be a television, notebook computer, PSP or other electronic device.

The 3D display panel and the 3D display device in the embodiment have advantages of low production cost and good display effect.

Embodiment 2

A method of manufacturing a phase difference plate according to the embodiment comprises the following steps:

Step S301, applying an alignment layer for the phase difference plate on a surface of an upper substrate of a display panel. Specifically, the surface of the upper substrate of the display panel is actually a surface of a base substrate of the upper substrate. Preferably, material for the alignment layer may not react with material for the upper surface of the upper substrate, and has a stronger adhesion to it. The polarizer concerned in each embodiment of the disclosed technology (including an upper polarizer and a lower polarizer), refers to an optical device capable of achieving a function of light polarization, including but not limited to the conventional polarizer.

Step S302, performing an alignment treatment on the alignment layer to divide the alignment layer into a plurality of regions having at least two different alignment directions. A specific manner of the alignment treatment is as follows: a mask is disposed on the alignment layer, and the alignment treatment is performed with irradiation of UV light, so as to divide the exposed alignment layer into the plurality of regions having different alignment directions. Of course, except for the above method of utilizing the UV light irradiation, the specific manners of the alignment treatment can also be other conventional methods in the field. In the embodiment, for example, it is possible to divide the alignment layer into a plurality of regions having two different alignment directions. A specific manner of the alignment treatment is as follows: a mask is disposed on the alignment layer, and the alignment treatment is performed with irradiation of UV light, so as to divide the exposed alignment layer into the plurality of regions having two different alignment directions. For example, an angle between the two alignment directions may be 45° to 135°. Preferably, the angle between the alignment directions is 90°. Further, one of the alignment directions is parallel to a polarization direction of light emitted from the upper polarizer, and another alignment direction is perpendicular to the polarization direction of light emitted from the upper polarizer. The above angle between polarization directions is preferably set as 90°, which is a preferable design on the premise that the angle between the polarization directions for different lenses of existing polarized glasses is 90°. It can be understood by those skilled in the art that, in the embodiment, a 3D display effect can be realized only if polarization directions for the upper polarizer of the display panel, the phase difference plate and the polarized glasses match with one another. In the case where the angle between polarization directions for the polarized glasses is not 90° (for example, may also be 60°), the angle between different alignment directions is preferably not 90° (for example, may also be 60°), either.

Figure 7:
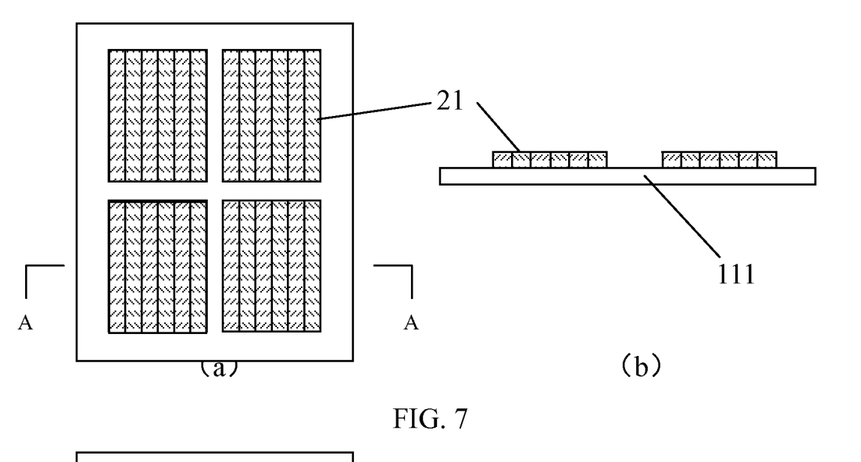
FIG. 7 is a schematic view obtained after an alignment layer for a phase difference plate is produced on an upper substrate, in which, the alignment layer is divided into a number of vertical bar-like regions, (a) is a top view, and (b) is sectional view taken along the line A-A.

The two kinds of regions, which have different alignment directions, of the alignment layer may be two regions with different alignments in any form. For example, a number of bar-like regions with a certain alignment angle are formed on the upper substrate, and every two adjacent bar-like regions have different alignment directions. The bar-like regions may extend in a horizontal direction, a vertical direction or any other directions. Bar-like regions of different types (i.e. bar-like regions with different alignment directions) may be alternately arranged in sequence, and may be arranged in a chessboard shape or in other shapes. For the purpose of productive convenience, in the embodiment, the alignment layer is divided into a number of vertical bar-like regions, and alignment directions for every two adjacent bar-like regions are different. The process method may also be executed for a single panel alone. As a plurality of panels are produced on a mother plate in a general panel production, the process method may also be executed for the plurality of panels on the mother plate. A case in which four panels are produced is shown in FIG. 7. As shown in FIG. 7, (a), (b) in FIG. 7 illustrates an alignment layer 21 applied on an upper surface of the upper substrate (specifically, an upper surface of a base substrate 111 of the upper substrate), which is subjected to alignment. The alignment layer 21 is divided into a number of vertical bar-like regions and every two adjacent bar-like regions have different alignment directions. To ensure the display effect, each column of sub-pixels only can be covered by one kind of bar-regions (i.e., regions having one alignment direction), and each bar-like region may cover a part or all of one column of the sub-pixels, or may also cover more than one column of the sub-pixels. Preferably, each bar-like region covers exactly one column of the sub-pixels.

Figure 8:
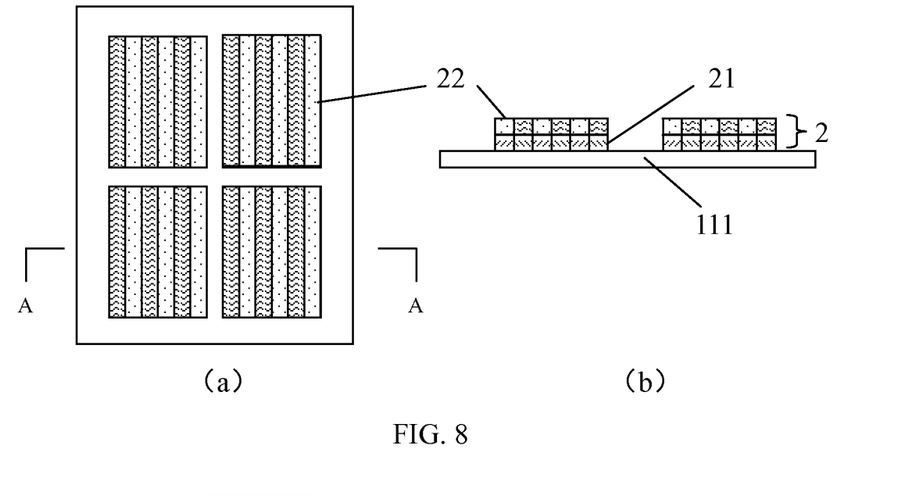
FIG. 8 is a schematic view obtained after a reactive mesogens (RM) is applied onto the alignment layer of the model shown in FIG. 7, (a) is a top view, and (b) is sectional view taken along the line A-A.
Figure 9:
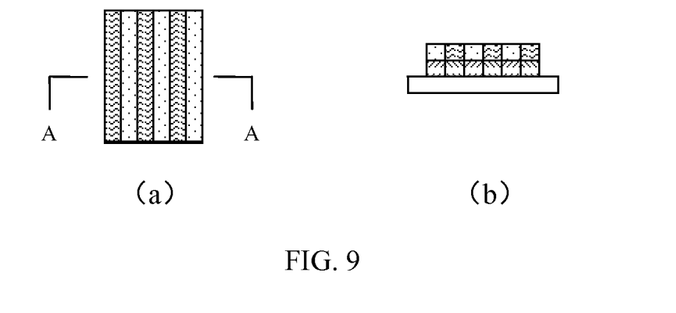
FIG. 9 is a schematic view obtained after a plurality of panels on a mother plate shown in FIG. 8 are cut apart to obtain a single panel, (a) is a top view, and (b) is sectional view taken along the line A-A.

Step S303, applying a RM layer on the alignment layer subjected to the alignment treatment, and solidifying the RM layer after being aligned, so as to form the phase difference plate. In the embodiment, RM is a liquid crystal polymer. As shown in (a) and (b) of FIG. 8, RM layer 22 is applied on the alignment layer 21. As the RM 22 is affected by the alignment direction of the alignment layer 21 before it is solidified, the alignment direction of the RM 22 after being solidified is consistent with the alignment direction of the alignment layer 21, so as to form the phase difference plate 2. FIG. 9 shows a case of a single panel after cutting. Due to lack of protection from a substrate for the phase difference plate, in order to avoid the phase difference plate from being scratched during cutting or carrying, a step of attaching a protective film on a surface of the phase difference plate can further be included after step S303.

Embodiment 3

Figure 10:
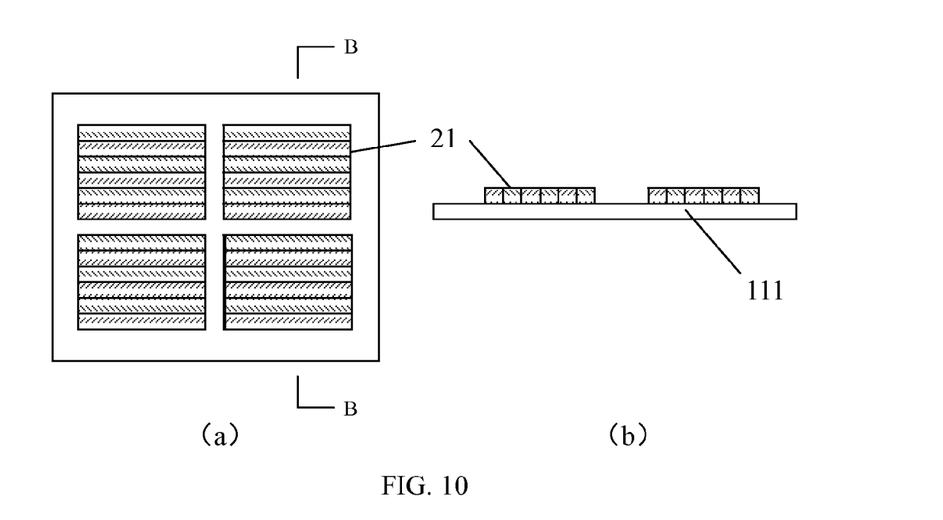
FIG. 10 is schematic view obtained after an alignment layer for a phase difference plate is produced on an upper substrate, in which, the alignment layer is divided into a number of horizontal bar-like regions, (a) is a top view, and (b) is sectional view taken along the line B-B.
Figure 11:
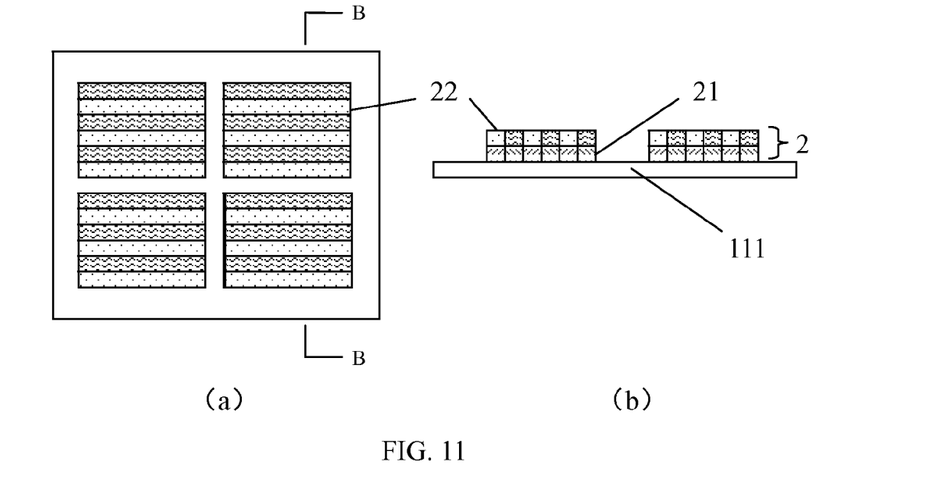
FIG. 11 is a schematic view obtained after a reactive mesogens (RM) is applied onto the alignment layer of the model shown in FIG. 10, (a) is a top view, and (b) is sectional view taken along the line B-B.
Figure 12:
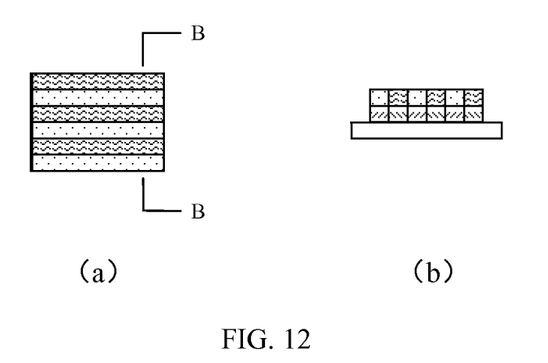
FIG. 12 is a schematic view obtained after a plurality of panels on a mother plate shown in FIG. 11 are cut apart to obtain a single panel, (a) is a top view, and (b) is sectional view taken along the line B-B.

As shown in FIGS. 10, 11 and 12, the difference between the present embodiment and embodiment 2 lies in that, in step S302, an alignment layer is divided into a number of horizontal bar-like regions after an alignment treatment is performed on the alignment layer, and every two adjacent bar-like regions have different alignment directions. That is, bar-like regions with different alignment directions are arranged alternately in a vertical direction. To ensure the display effect, each row of sub-pixels can only be covered by one kind of the bar-like regions (i.e., regions with one alignment direction), and each bar-like region may cover a part or all of one row of the sub-pixels, or may also cover more than one row of the sub-pixels. Preferably, to obtain a better display effect, each bar-like region covers exactly one row of the sub-pixels.

Figure 13:
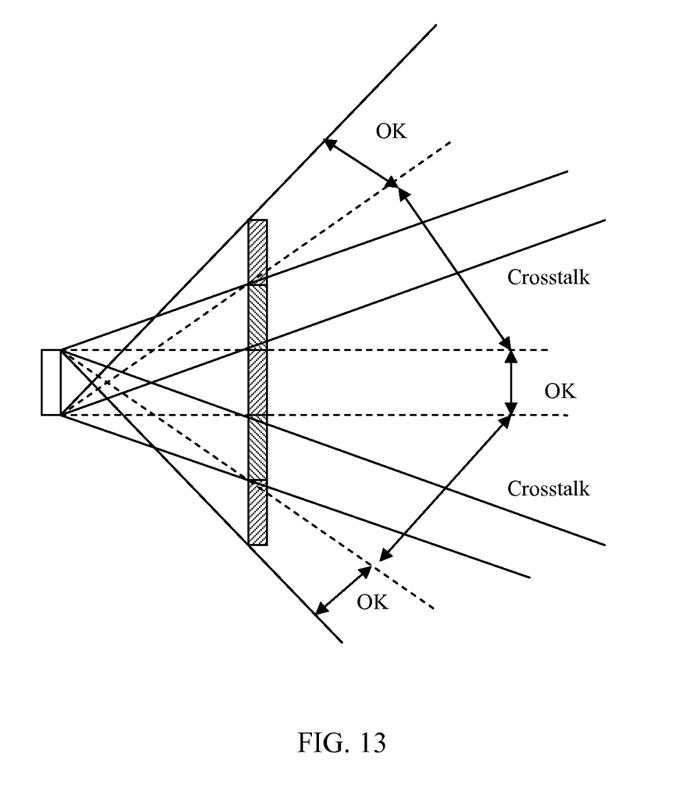
FIG. 13 is a view showing an effect when viewing of a 3D picture is achieved by means of utilizing a phase difference plate.

The case where horizontal bar-like regions are used on the phase difference plate is superior to the case where vertical bar-like regions are used in terms of the viewing effect. As shown in FIG. 13, one pixel is shown merely as an example to illustrate the viewing effect of user. As shown, a number of bar-like regions are in front of the one pixel. Letting the pixel provides content for a left-eye picture, a light emitted from the pixel via a left oblique line can be selected by a polarized lens for the left eye, and a light emitted from the pixel via a right oblique line will cause a crosstalk. As can be seen in the figure, if regions with different alignment directions are in a horizontal bar-like shape, an OK region and a crosstalk region occur alternately in a vertical direction; and if regions with different alignment directions are in a vertical bar-like shape, the OK region and the crosstalk region occur alternately in a horizontal direction. Human eyes are located horizontally and they have fewer opportunities to move up or down and have more opportunities to move to left or right. Therefore, if the vertical bar-like regions are used on the phase difference plate, the OK region and the crosstalk region will occur alternately in the horizontal direction, causing that a phenomenon that the right eye is located in the crosstalk region when the left eye is in the OK region, or enters into the crosstalk region if the eyes move slightly, so as to affect the viewing. If the horizontal bar-like regions are used on the phase difference plate, the OK region and the crosstalk region will occur alternately in the vertical direction. As such, both eyes will always fall into the OK region provided that a person sits in a place.

In the practice, there is always a case of screen overturning, and the picture will be overturned along with it, especially for some handheld terminal products. After overturned, the bar-like regions of the phase difference plate may become vertical from horizontal, or become horizontal from vertical. Therefore, the 3D display effects achieved by embodiments 2 and 3 may interchange.

Embodiment 4

A method of manufacturing a 3D display panel is provided by the embodiment. The method comprises producing an upper polarizer inside a liquid crystal panel upon formation of the liquid crystal panel; and further comprises producing a phase difference plate by using the method of manufacturing the phase difference plate as described in embodiment 2 or 3. Herein, producing the upper polarizer inside the liquid crystal panel comprises producing the upper polarizer at a surface for different layers, such as, a surface of a base substrate, a surface of a color filter layer, etc., of an upper substrate of the liquid crystal panel.

A method of manufacturing a 3D display panel is further provided by the embodiment. The method comprises producing an upper polarizer between a base substrate and a color filter layer of an upper substrate of a liquid crystal panel upon formation of the liquid crystal panel; and further comprises producing a phase difference plate by using the method of manufacturing the phase difference plate as described in embodiment 2 or 3. The configuration of the 3D display panel produced by this method may be the same as that shown in FIG. 3A. Certainly, the position of a lower polarizer may further change, for example, to be the same as that shown in FIG. 3D.

A method of manufacturing a 3D display panel is further provided by the embodiment. The method comprises producing an upper polarizer at a lower surface of a color filter layer of an upper substrate of a liquid crystal panel upon formation of the liquid crystal panel; and further comprises producing a phase difference plate by using the method of manufacturing the phase difference plate as described in embodiment 2 or 3. The configuration of the 3D display panel produced by this method may be the same as that shown in FIG. 3B. Certainly, the position of a lower polarizer may further change.

A method of manufacturing a 3D display panel is further provided by the embodiment. The method comprises: upon formation of the liquid crystal panel, forming a lower substrate which comprises a base substrate, an array layer and a color filter layer, forming an upper substrate which comprises a base substrate, and producing an upper polarizer at a lower surface of the base substrate of the upper substrate of the liquid crystal panel; and further comprises producing a phase difference plate by using the method of manufacturing the phase difference plate as described in embodiment 2 or 3. The configuration of the 3D display panel produced by this method may be the same as that shown in FIG. 3C. Certainly, the position of a lower polarizer may further change.

As seen from above, the method of manufacturing the phase difference plate provided by embodiments 2 and 3 can be used to manufacture 3D display panels in various forms as set forth in embodiment 1. For the 3D display panels produced by the above methods, the alignment accuracy of the phase difference plate with the display panel and the yield of the product are enhanced, and use of a substrate for the phase difference plate and an adhesive is reduced, to thereby decrease the cost, and meanwhile reduce the loss of transmissive light and increase the viewing angle. These panels have advantages of low production cost, good display effect, and so on.

It should be noted that the above embodiments only have the purpose of illustrating the disclosed technology, but not limiting it. Although the disclosed technology has been described with reference to the above embodiment, those skilled in the art should understand that modifications or alternations can be made to the solution or the technical feature in the described embodiments without departing from the spirit and scope of the disclosed technology.

What is claimed is:

1. A three dimensional (3D) display panel, comprising:
    a liquid crystal panel which comprises an upper substrate and a lower substrate, the upper substrate comprising an upper polarizer, the lower substrate comprising a lower polarizer;
    a phase difference plate which is directly disposed on an upper surface of the upper substrate of the liquid crystal panel;
    wherein, the phase difference plate comprises an alignment layer which is divided into a plurality of regions with two different alignment directions, and a layer of reactive mesogens cover a surface of the alignment layer, and the reactive mesogens is a substance having a birefringence characteristic and capable of being aligned and solidified;
    the phase difference plate is used to make images displayed on the 3D panel form into stereoscopic image pairs,
    wherein the upper polarizer is located inside the liquid crystal panel.

2. The 3D display panel of claim 1, wherein the upper substrate is a color filter substrate, the color filter substrate comprises a base substrate and a color filter layer, and the upper polarizer is located between the base substrate and a color filter layer.

3. The 3D display panel of claim 1, wherein the upper substrate is a color filter substrate, the color filter substrate comprises a base substrate and a color filter layer formed on the base substrate, and the upper polarizer is located at a lower surface of the color filter layer.

4. The 3D display panel of claim 1, wherein the lower substrate of the liquid crystal panel comprises a base substrate, an array layer and a color filter layer, the upper substrate of the liquid crystal panel comprises a base substrate, and the upper polarizer is located at a lower surface of the base substrate of the upper substrate.

5. The 3D display panel of claim 1, wherein an angle between the two different alignment directions is 45° to 135°.

6. The 3D display panel of claim 5, wherein an angle between the two different alignment directions is 90°.

7. The 3D display panel of claim 6, wherein, among the two different alignment directions, one alignment direction is parallel to a polarization direction of light emitted from the upper polarizer, and another alignment direction is perpendicular to the polarization direction of the light emitted from the upper polarizer.

8. The 3D display panel of claim 1, wherein the alignment layer is divided into a number of vertical or horizontal bar-like regions, and every two adjacent bar-like regions have different alignment directions.

9. The 3D display panel of claim 8, wherein each bar-like region covers one row or column of the sub-pixels.

10. The 3D display panel of claim 1, wherein a protective film is attached on the surface of the phase difference plate.

11. The 3D display panel of claim 1, wherein the reactive mesogens is a liquid crystal polymer.

12. The 3D display panel of claim 1, wherein the lower substrate comprises a base substrate and an array layer, and the lower polarizer is located between the base substrate of the lower substrate and the array layer.

13. A method of manufacturing a 3D display panel, wherein the method comprises producing an upper polarizer inside a liquid crystal panel upon formation of the liquid crystal panel; and further comprises producing a phase difference plate,
   wherein producing a phase difference plate comprises the following steps:
   S1: applying an alignment layer on a surface of an upper substrate of the display panel;
   S2: performing an alignment treatment on the alignment layer, so as to divide the alignment layer into a plurality of regions with two different alignment directions; and
   S3: applying a layer of reactive mesogens on the alignment layer subjected to the alignment treatment, and have the reactive mesogens aligned and solidified, so as to form the phase difference plate, wherein the reactive mesogens is a substance having a birefringence characteristic and capable of being aligned and solidified; the phase difference plate is used to make images displayed on the 3D panel form into stereoscopic image pairs.

14. The method of manufacturing a 3D display panel of claim 13, wherein the step of producing an upper polarizer inside a liquid crystal panel upon formation of the liquid crystal panel comprises: producing an upper polarizer between a base substrate and a color filter layer of an upper substrate of a liquid crystal panel upon formation of the liquid crystal panel.

15. The method of manufacturing a 3D display panel of claim 13, wherein the step of producing an upper polarizer inside a liquid crystal panel upon formation of the liquid crystal panel comprises: producing an upper polarizer at a lower surface of a color filter layer of an upper substrate of a liquid crystal panel upon formation of the liquid crystal panel.

16. The method of manufacturing a 3D display panel of claim 13, wherein the step of producing an upper polarizer inside a liquid crystal panel upon formation of the liquid crystal panel comprises: upon formation of the liquid crystal panel, forming a lower substrate which comprises a base substrate, an array layer and a color filter layer, forming an upper substrate which comprises a base substrate, and producing an upper polarizer at a lower surface of the base substrate of the upper substrate of the liquid crystal panel.

\* \* \* \* \*